(12) United States Patent
Bridger et al.

(10) Patent No.: US 11,140,097 B2
(45) Date of Patent: Oct. 5, 2021

(54) CROSS POINT SWITCH OF NETWORK DEVICE FOR REORDERING LANES OF NETWORK INTERFACES

(71) Applicant: Arista Networks, Inc., Santa Clara, CA (US)

(72) Inventors: Andrew Bruce Bridger, Sydney (AU); Marc Durrenberger, Sydney (AU)

(73) Assignee: Arista Networks, Inc., Santa Clara, CA (US)

( * ) Notice: Subject to any disclaimer, the term of this patent is extended or adjusted under 35 U.S.C. 154(b) by 55 days.

(21) Appl. No.: 16/597,534

(22) Filed: Oct. 9, 2019

(65) Prior Publication Data

US 2021/0112018 A1    Apr. 15, 2021

(51) Int. Cl.
*H04L 12/933* (2013.01)
*H04L 25/03* (2006.01)
*H04L 12/24* (2006.01)

(52) U.S. Cl.
CPC ...... *H04L 49/101* (2013.01); *H04L 25/03872* (2013.01); *H04L 41/0806* (2013.01)

(58) Field of Classification Search
CPC ... G06F 13/42; H04L 12/40; H04L 25/03872; H04L 25/14; H04L 41/0806; H04L 49/101; H04J 3/0697
See application file for complete search history.

(56) References Cited

U.S. PATENT DOCUMENTS

| 8,488,729 | B1* | 7/2013 | Mendel | H04L 25/14 |
| | | | | 375/354 |
| 8,913,705 | B2* | 12/2014 | Chang | H04L 25/14 |
| | | | | 375/372 |
| 8,949,493 | B1* | 2/2015 | Wortman | H04L 25/03866 |
| | | | | 710/65 |
| 9,246,617 | B2* | 1/2016 | Caggioni | H04J 3/16 |
| 9,395,744 | B2* | 7/2016 | Benjamini | G06F 1/00 |
| 2010/0284486 | A1* | 11/2010 | Kuwata | H04L 25/14 |
| | | | | 375/295 |
| 2014/0269769 | A1* | 9/2014 | Gresham | H04L 47/34 |
| | | | | 370/474 |
| 2015/0003477 | A1* | 1/2015 | Baeckler | H04L 25/14 |
| | | | | 370/503 |

* cited by examiner

*Primary Examiner* — Frank Duong
(74) *Attorney, Agent, or Firm* — Fountainhead Law Group P.C.

(57) ABSTRACT

Some embodiments provide a network device that may receive alignment information at each physical connection of a network interface of the network device. Each alignment information includes a unique value for identifying a unique logical lane associated with the corresponding physical connection. The network device may determine the order of the unique logical lanes associated with the several physical connections based on the received alignment information. The network device may configure a cross point switch of the network device to reorder the physical connections so that the unique logical lanes associated with the physical connections are ordered according to a defined order.

20 Claims, 7 Drawing Sheets

CROSS POINT SWITCH OF NETWORK DEVICE FOR REORDERING LANES OF NETWORK INTERFACES

BACKGROUND

Network devices are commonly used to facilitate the transfer of data among devices on a computer network. Different network devices may perform different functions. For instance, layer 1 network devices are typically configured to transfer data at the physical layer (layer 1). However, they do not manage any of the traffic coming through them. Layer 2 network devices may be configured to process and forward data at the data link layer (layer 2) based on hardware addresses (e.g., media access control (MAC) addresses). As another example, layer-3 devices can be configured to process and forwards data at the network layer (layer 3) based on routing protocols (e.g., an Internet Protocol (IP) routing protocol).

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

A network device can have several network interfaces, such as Ethernet ports, through which data is received from and transmitted to other network devices. In some cases, the network interfaces may conform to a network port standard (e.g., a 40G-Base-CR4 network port standard). At the physical layer, each network interface may have four physical connections. A receiving network device can receive packets from a transmitting network device. The transmitting network device may divide Ethernet packets into 64/66 blocks, allocate the blocks one at a time to each physical layer interface (also referred to as a lane), and transmit the blocks to the receiving network device. The order of writing to lanes is always lane 0, lane 1, lane 2, lane 3, lane 0, lane 1, lane 2, etc. However, the physical layer may re-order the lanes. That is, the lanes can be swapped. The receiving network device needs to reorder the lanes before it can correctly decode a packet. The transmitting network device periodically sends alignment markers to allow the receiving network device to uniquely identify each physical connection (i.e., lane) and then reorder the lanes according to a defined order.

Figure 1A:
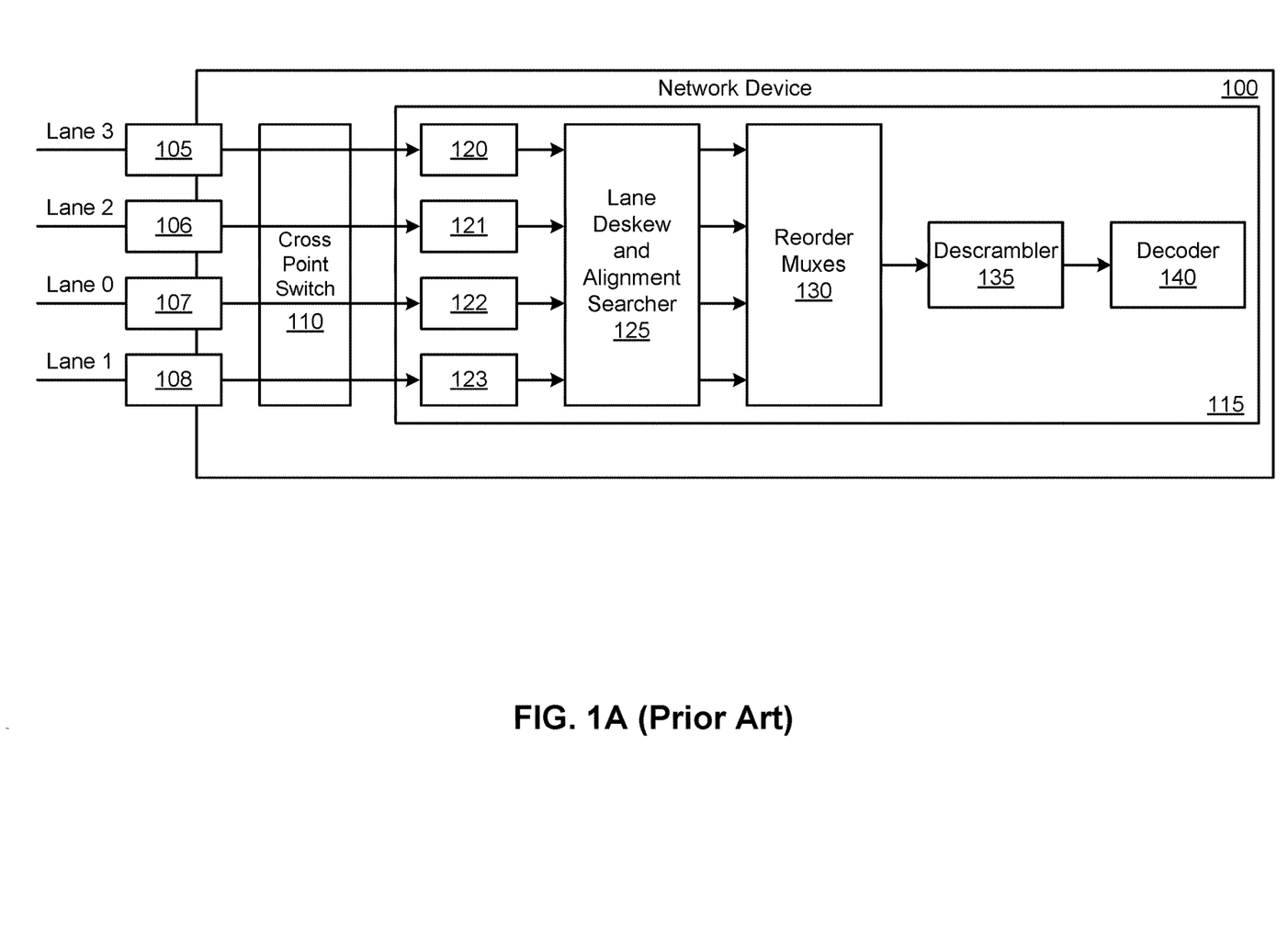
FIG. 1A illustrates an example network device.

FIG. 1A illustrates an example network device 100. Specifically, network device 100 illustrates a network device in the prior art that implements the reordering of lanes of a network interface of the network device in a field programmable gate array (FPGA). As shown, network device 100 includes physical connections 105-108, cross point switch 110, and FPGA 115. Physical connections 105-108 can collectively act as a network interface (e.g., an Ethernet interface) for communicating with a transmitting network device. Cross point switch 110 includes four inputs coupled to physical connections 105-108 and four outputs coupled to transceivers 120-123. Cross point switch 240 can be configured so that any input can be connected to any output. In this example, cross point switch 110 is configured pass the inputs straight through to the corresponding transceivers. That is, the input coupled to physical connection 105 is connected to the output coupled to transceiver 120, the input coupled to physical connection 106 is connected to the output coupled to transceiver 121, the input coupled to physical connection 107 is connected to the output coupled to transceiver 122, and the input coupled to physical connection 108 is connected to the output coupled to transceiver 123.

When each of the transceivers 120-123 receives a block of encoded and scrambled data, it performs some processing and sends it to lane deskew and alignment searcher 125. Lane deskew and alignment searcher 125 searches the blocks of data received from the transceivers 120-123 for alignment data indicating which logical lane is associated with which physical connection. As shown in FIG. 1A, for this example, physical connection 105 is associated with lane 3, physical connection 106 is associated with lane 2, physical connection 107 is associated with lane 0, and physical connection 108 is associated with lane 1. Once detected, lane deskew and alignment searcher 125 passes the alignment data to reorder multiplexers (muxes) 130. Reorder muxes 130 needs to pass blocks of data one at a time to descrambler 135 in a defined order. In this example, descrambler 135 expects to receive blocks of data in a round robin manner from lane 0 first, lane 1 second, lane 2 third, and lane 3 fourth. For this example, descrambler expects a first block of data received at physical connection 107 (i.e., lane 0), a second block of data received at physical connection 108 (i.e., lane 1), a third block of data received at physical connection 106 (i.e., lane 2), a fourth block of data received at physical connection 105 (i.e., lane 3), a fifth block of data received at physical connection 107 (i.e., lane 0), a sixth block of data received at physical connection 108 (i.e., lane 1), and so on and so forth. In order to reorder the lanes into the defined order, reorder muxes 130 uses several multiplexers (e.g., 4:1 multiplexers) that select the appropriate input based on the alignment data. Continuing with the example above, for the first block of data received at physical connection 107, reorder muxes 130 would select the third input to output to descrambler 135. For the second block of data received at physical connection 108, reorder muxes 130 would select the fourth input to output to descrambler 135. For the third block of data received at physical connection 106, reorder muxes 130 would select the second input to output to descrambler 135. For the fourth block of data received at physical connection 105, reorder muxes 130 would select the first input to output to descrambler 135. As descrambler 135 receives blocks of data, it descrambles the blocks and sends it to decoder 140, which decodes blocks of data into packets.

Figure 1B:
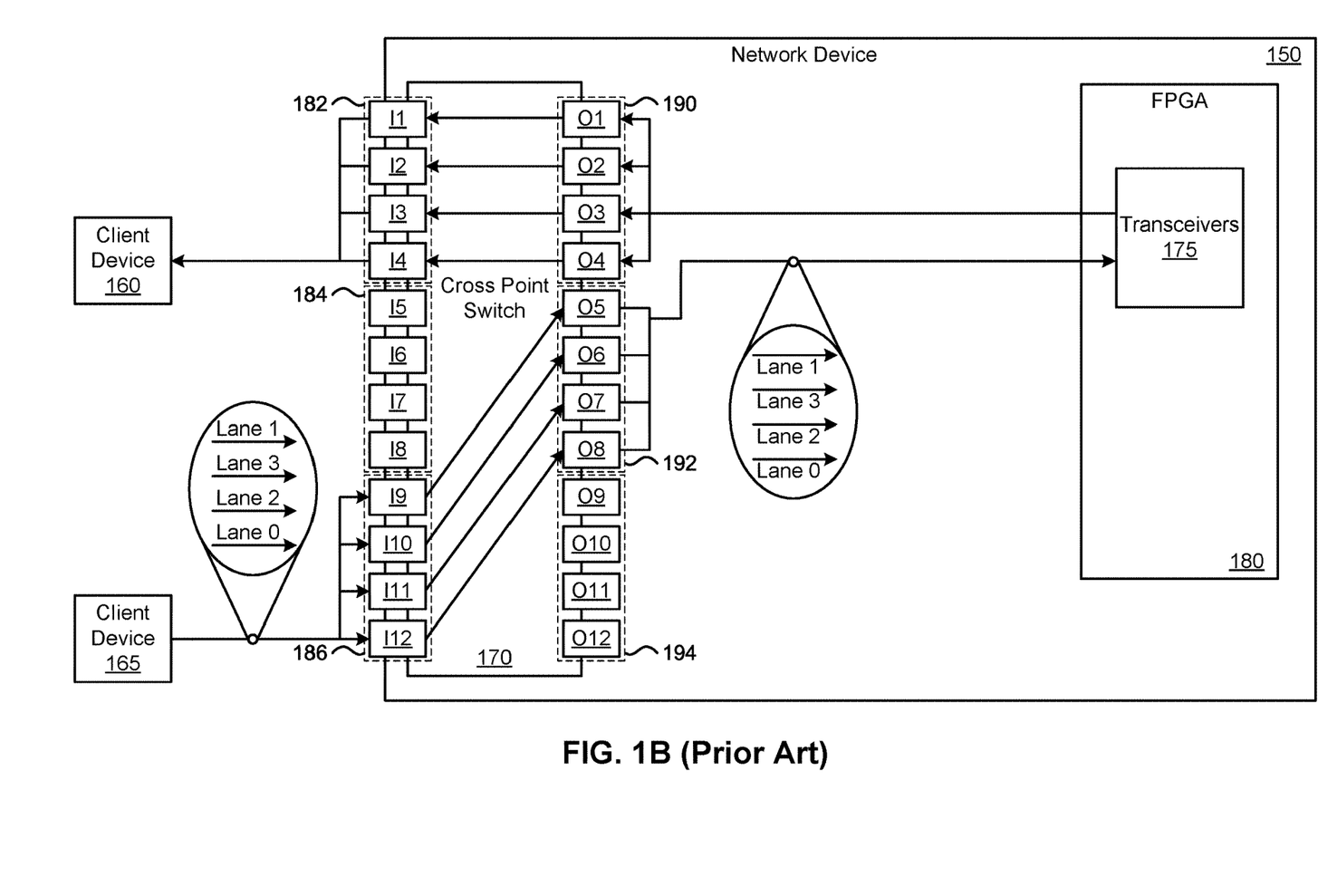
FIG. 1B illustrates another example network device.

FIG. 1B illustrates another example network device 150. In particular, network device 150 illustrates another network device in the prior art that implements the reordering of lanes of a network interface of the network device in a field programmable gate array (FPGA). As illustrated, network device 150 includes cross point switch 170 and FPGA 180. FPGA 18—includes transceivers 175. Cross point switch 170 includes twelve inputs I1-I12 and twelve outputs O1-O12. Each input I1-I12 may be coupled to a physical connection (not shown). Each input of cross point switch 170 can be configured to connect to any output of cross point switch 170. In this example, inputs I1-I4 collectively form an input port 182, inputs I5-I8 collectively form an input port 184, and inputs I9-I12 collectively form an input port 186. The physical connections coupled to each of the input ports 182-186 collectively form a network interface (not shown) of network device 150. Similarly, outputs O1-O4 collectively form an output port 190, outputs O5-O8 collectively form an output port 192, and outputs O9-O12 collectively form an output port 194. For this example, input port 186 is connected to output port 192. Thus, input I9 is connected to output O5, input I10 is connected to output O6, input I11 is connected to output O7, and input I12 is connected to output O8. In addition, input port 182 is connected to output port 190. As such, input I1 is connected to output O1, input I2 is connected to output O2, input I3 is connected to output O3, and input I4 is connected to output O4.

While FIG. 1A illustrates a single network interface that includes four physical connections passing through a cross point switch, network device 150 in FIG. 1B has three such network interfaces passing through a cross point switch. Similar to the single network interface of network device 100, each of the network interfaces also includes four physical connections (not shown). Just like the physical connections of the network interface of network device 100, the physical connections coupled to the network interfaces of network device 150 pass through cross point switch 170 in the same order (i.e., cross point switch 170 does not perform any reordering of the physical connections).

FIG. 1B also illustrates client device 160 connected to a first network interface formed by the physical connections coupled to inputs I1-I4 of cross point switch 170 and client device 165 connected to a second network interface formed by the physical connections coupled to inputs I9-I12 of cross point switch 170. In this example, client device 165 is sending blocks of encoded and scrambled data through the second network interface, which is connected to outputs O5-O8. As shown, the order of the lanes associated with the physical connections of the second network interface is 1, 3, 2, 0. As the blocks of data pass through cross point switch 170 and out outputs O5-O8, the order of the lanes remains the same. As shown, the order of the lanes between outputs O5-O8 and transceivers 175 is still 1, 3, 2, 0. Upon receiving the blocks of data, transceiver 175 passes it to FPGA 180 for processing. FPGA 180 reorders the lanes, descrambles the blocks of data, and decodes the blocks of data into packets in a similar manner as that described above by reference to network device 100. The packets are then transmitted back out transceiver 175 to the first network interface through inputs I1-I4 via outputs O1-O4 of cross point switch 175 and finally to client device 160.

Described herein are techniques for using a cross point switch of a network device to reorder lanes for network interfaces of the network device. In some embodiments, a network device includes a set of network interfaces. Each network interface may include several physical connections. When the network interface of the network device receives data from another network device, the data is received in chunks (also referred to as blocks) that are allocated across the different physical connections in a defined order of logical lanes. In order to determine the logical lane associated with each physical connection, the network interface of the network device may receive alignment information at each of the physical connections that uniquely identifies the logical lane with which the physical connection is associated. Based on the alignment information, the network device can configure a cross point switch of the network device to reorder the physical connections so that the logical lanes associated with the physical connections are ordered according to the defined order of logical lanes. This way, the network device is able to process the data received at the physical connections in the correct order, which allows the network device to correctly reconstruct the data received from the other network device.

Using the techniques described herein, the latency through prior art network devices, such as the ones illustrated in FIGS. 1A and 1B may be reduced. Referring to network device 100 as an example, cross point switch 110 may be utilized to reorder the physical connections so that the logical lanes associated with the physical connections are ordered according to the defined order of logical lanes. In addition, reorder muxes 130 can be removed from FPGA 115. Since the cross point switch is already part of the data path before FPGA 115, there is no added latency by using the cross point switch to perform the lane reordering. Thus, removing reorder muxes 130 from FPGA 115 reduces the latency through network device 100 because the data path through FPGA 115 has one less component.

The techniques described in the present application provide a number of benefits and advantages over conventional methods for reordering logical lanes for network interfaces of network devices. For instance, in some embodiments, a network device may include a cross point switch that is part of the data path used to process data received from another network device. By leveraging the cross point switch of the network device, which already part of the data path used to process data, to reorder the physical connections of a network interface receiving the data from the other network device, the network device is able to avoid using particular components (e.g., a set of multiplexors) that would otherwise be used in certain implementations of conventional network devices (e.g., network device 100) to reorder the physical connections. Hence, the technical effect provided by the techniques described herein is reducing the latency through the network device by the amount of latency incurred by the processing of data by the particular components. Reducing and/or removing latency in a network device is particularly advantageous in applications where providing the lowest possible latency is desirable (e.g., trading infrastructures of trading companies).

Figure 2:
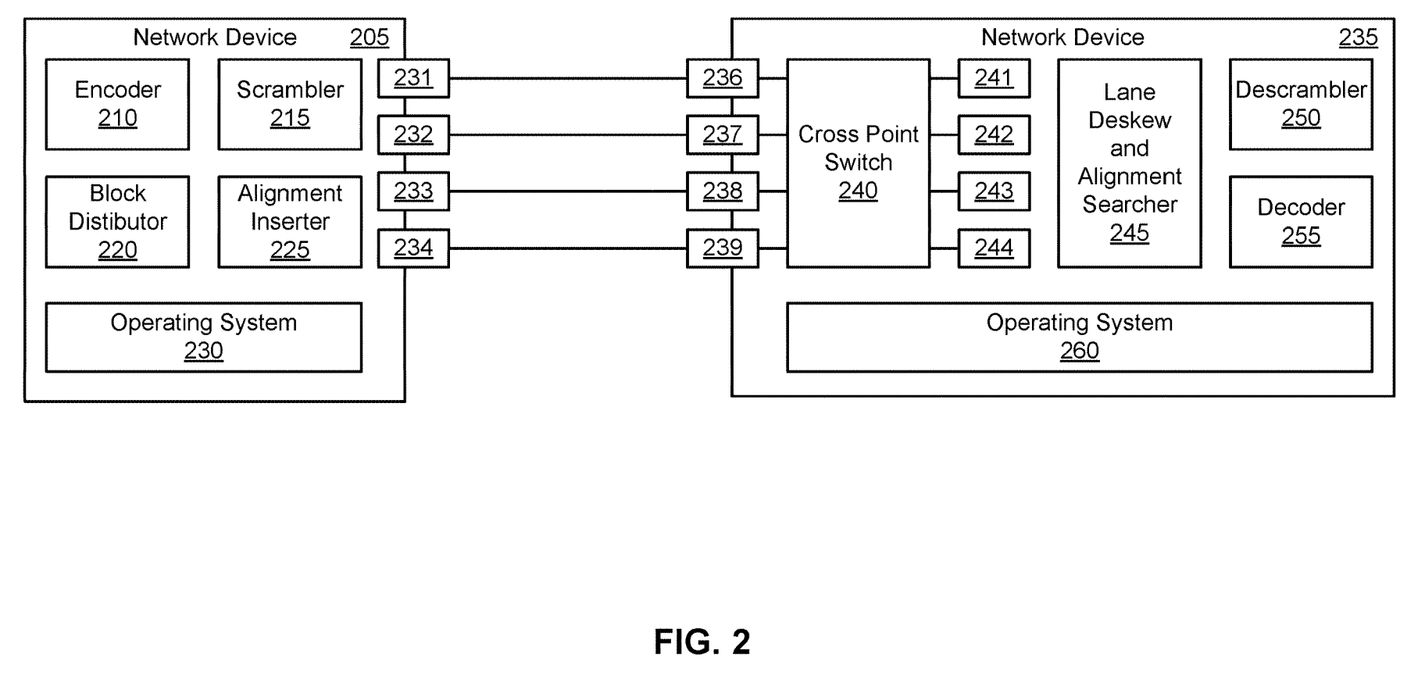
FIG. 2 illustrates a system according to some embodiments.

FIG. 2 illustrates a system 200 according to some embodiments. As shown, system 200 includes network device 205 and network device 235, which are communicatively coupled via four physical links (e.g., fiber optic cables). In some embodiments, network device 205 and network device 235 are layer 1 network switches. In this example, network device 205 is a network device configured to process and transmit data to network device 235 while network device 235 is configured to receive the data from network device 205 and process it. As illustrated in FIG. 2, network device 205 includes encoder 210, scrambler 215, block distributor 220, alignment inserter 225, operating system 230, and physical connections 231-234. In some embodiments, physical connections 231-234 collectively serve as a network interface (e.g., an Ethernet interface) for communicating with other network devices (e.g., network device 235). In some embodiments, each of the physical connections 231-234 can be implemented as a small form-factor pluggable (SFP) transceiver. In other embodiments, physical connections 231-234 may be implemented as a quad small form-factor pluggable (QSFP) transceiver.

Encoder 210 is configured to encode packets of data intended to be transmitted to network device 235 into blocks of encoded data. For example, encoder 210 may take an Ethernet packet and divide it into blocks of data having a defined bit-length (e.g., 32 bits, 64 bits, etc.). Once the Ethernet packet is divided into such blocks of data, encoder 210 encodes each of the blocks of data. In some embodiments, encoder 210 uses a 64b/66b encoding scheme to encode the blocks of data. In some such embodiments, encoder 210 divides the Ethernet packet into blocks of 64 bit data. Then, the 64b/66b encoding scheme that encoder 210 employs transforms a 64 bit block of data to a 66 bit line code. A line code can be a pattern of voltage, current, or photons used to represent digital data transmitted down a transmission line. After encoding the block of data, encoder 210 sends the block of encoded data to scrambler 215 for further processing. Encoder 210 may continue to process remaining blocks of data in the same manner.

Scrambler 215 is responsible for processing blocks of encoded data. For instance, scrambler 215 can receive a block of encoded data from encoder 210. In response to receiving the block of encoded data, scrambler 215 may scramble the block of encoded data. In some embodiments, scrambler 215 utilizes a self-synchronizing scrambling technique to scramble the block of encoded data. Once scrambler 215 scrambles the block of encoded data, scrambler 215 sends it to block distributor 220 for further processing.

Block distributor 220 is configured to process encoded and scrambled blocks of data. For example, block distributor 220 may receive a block of scrambled and encoded data from scrambler 215. Upon receiving the block of data, block distributor 220 distributes it to a logical lane associated with one of the physical connection 231-234. In some embodiments, block distributor 220 distributes sequential blocks of data to logical lanes in a round robin manner. As an example, assume that physical connection 231 is associated with logical lane 0, physical connection 232 is associated with logical lane 1, physical connection 233 is associated with logical lane 2, and physical connection 234 is associated with logical lane 3. In addition, assume block distributor 220 receives a first block of data first, a second block of data second, a third block of data third, etc. In such an example, block distributor 220 may distribute the first block of data to logical lane 0 (i.e., physical connection 231), the second block of data to logical lane 1 (i.e., physical connection 232), the third block of data to logical lane 2 (i.e., physical connection 233), the fourth block of data to logical lane 3 (i.e., physical connection 234), the fifth block of data to logical lane 0 (i.e., physical connection 231), the sixth block of data to logical lane 1 (i.e., physical connection 232), and so on and so forth. After distributing a block of data to a logical lane, block distributor 220 sends it to alignment inserter 225.

Alignment inserter 225 handles the insertion of alignment data to the data streams transmitted through physical connections 231-234. For instance, alignment inserter 225 may receive blocks of data from block distributor 220 and forward them to the physical connections 231-234 determined by block distributor 220. Periodically, alignment inserter 225 can insert alignment data into data stream of each physical connection 231-234. In some embodiments, alignment inserter 225 inserts alignment data into data stream of each physical connection 231-234 at intervals of a defined number of blocks (e.g., 1,000 blocks, 5,000 blocks, 16,383 blocks, 20,000 blocks, etc.) transmitted through each physical connection 231-234. For example, after the defined number of blocks have been transmitted through each physical connection 231-234, alignment inserter 225 inserts alignment data into the data stream of each physical connection 231-234. Then after another defined number of blocks have been transmitted through each physical connection 231-234, alignment inserter 225 again inserts alignment data into the data stream of each physical connection 231-234. In some embodiments, the alignment data that alignment inserter 225 inserts into the data stream of one of the physical connections 231-234 includes data indicating a logical lane with which the physical connection is associated. Using the example above where physical connection 231 is associated with logical lane 0, physical connection 232 is associated with logical lane 1, physical connection 233 is associated with logical lane 2, and physical connection 234 is associated with logical lane 3, the alignment data that alignment inserter 225 inserts into the data stream of physical connection 231 indicates logical lane 0 is associated with physical connection 231. Similarly, the alignment data that alignment inserter 225 inserts into the data stream of physical connection 232 indicates logical lane 1 is associated with physical connection 231, the alignment data that alignment inserter 225 inserts into the data stream of physical connection 233 indicates logical lane 2 is associated with physical connection 231, and the alignment data that alignment inserter 225 inserts into the data stream of physical connection 234 indicates logical lane 3 is associated with physical connection 231. In some embodiments, the data used to indicate a logical lane may be a predefined unique value for identifying a unique logical lane associated with a physical connection. For instance, continuing with the aforementioned example, the data used to indicate logical lane 0 can be a first predefined unique value, the data used to indicate logical lane 1 can be a second predefined unique value, the data used to indicate logical lane 2 can be a third predefined unique value, and the data used to indicate logical lane 3 can be a fourth predefined unique value.

Operating system 230 is a software program executable on network device 205 that performs a variety of functions for facilitating the operation of network device 205. For example, operating system 230 may provide a command line interface (CLI) through which network device 205 (e.g., components of network device 205) can be configured and/or programmed. Operating system 130 can also configure the mode of the ports 231-234. For example, in some embodiments, ports 231-234 can be configured as four independent links (e.g., four 10 Gigabit links). In some such embodiments, each independent link may have its own encoder and scrambler. In addition, operating system 230 can receive status information from ports 231-234. Examples of such status information include whether an SFP transceiver is plugged in the ports 231-234 or not, the transmit power (tx) level, the receive (rx) light level, etc.

FIG. 2 further illustrates that network device 235 includes physical connections 236-239, cross point switch 240, transceivers 241-244, lane deskew and alignment searcher 245, descrambler 250, decoder 255, and operating system 260. In some embodiments, physical connections 236-239 collectively serve as a network interface (e.g., an Ethernet interface) for communicating with other network devices (e.g., network device 205). In some embodiments, each of the physical connections 236-239 can be implemented as a small form-factor pluggable (SFP) transceiver. In other embodiments, physical connections 236-239 may be implemented as a quad small form-factor pluggable (QSFP) transceiver.

As shown, cross point switch 240 includes four inputs coupled to physical connections 236-239 and four outputs coupled to transceivers 241-244. Cross point switch 240 may be configured so that any input may be connected to any output. In some instances, cross point switch 240 receives configuration information from operating system 260 that specifies which input is to be connected to which output. In response to receiving such configuration information, cross point switch 240 configures itself accordingly.

Transceivers 241-244 is configured to process blocks of encoded and scrambled data received from physical connections 236-239 via cross point switch 240. For example, when one of the transceivers 241-244 receives a block of encoded and scrambled data from one of the physical connections 236-239 via cross point switch 240, the transceiver converts the serial string of bits of the block of data into a parallel string of bits. The transceiver can also perform some clock recovering operations based on the block of encoded and scrambled data. After processing the block of data, the transceiver sends it to lane deskew and alignment searcher 245 for further processing.

Lane deskew and alignment searcher 245 can be configured to search for alignment data in the blocks of data received from transceivers 241-244. As mentioned above, in some embodiments, alignment data inserted into a data stream of a physical connection may be a predefined unique value associated with a logical lane in order to indicate the logical lane is associated with the physical connection. In some such embodiments, lane deskew and alignment searcher 245 checks the blocks of data received from transceivers 241-244 for such predefined values. When lane deskew and alignment searcher 245 detects alignment data from each of the transceivers 241-244, lane deskew and alignment searcher 245 determines, for each of the transceivers 241-244, the logical lane associated with the transceiver based on the alignment data. Next, lane deskew and alignment searcher 245 sends those determinations to operating system 260.

Lane deskew and alignment searcher 245 may also be configured to perform data deskew operations on blocks of encoded and scrambled data based on the detected alignment data. For instance, there may be instances where block of data transmitted from network device 205 at the same time may arrive at network device 235 at different times. This may be due to the physical links between network device 205 and network device 235 being different lengths. Therefore, when lane deskew and alignment searcher 245 receives alignment data from transceivers 241-244, lane deskew and alignment searcher 245 may adjust the skew of the blocks of data received from transceivers 241-244 so that the alignment data received at each of the transceivers 241-244 line up. Lane deskew and alignment searcher 245 may accomplish this by locking the lane of a transceiver when lane deskew and alignment searcher 245 detects alignment data in the lane of the transceiver and buffering blocks of data received at the transceiver. When the lanes of the transceivers 241-244 are locked (i.e., lane deskew and alignment searcher 245 has detected alignment data in the lane of each of the transceivers 241-244), lane deskew and alignment searcher 245 can removes the alignment data and unlocks the lanes. Lane deskew and alignment searcher 245 may perform the deskew operations described above every time it detects alignment data received from transceivers 241-244. After the blocks of data buffered from each of the transceivers 241-244 are aligned based on the alignment data, lane deskew and alignment searcher 245 may send descrambler 250 blocks of data from each of the transceivers 241-244 in a round robin manner. For instance, lane deskew and alignment searcher 245 can first send a block of data received from transceiver 241 to descrambler 250, then send a block of data received from transceiver 242 to descrambler 250, then send a block of data received from transceiver 243 to descrambler 250, then send a block of data received from transceiver 244 to descrambler 250, then send a block of data received from transceiver 241 to descrambler 250, then send a block of data received from transceiver 242 to descrambler 250, and so on and so forth.

Descrambler 250 is responsible for blocks of encoded and scrambled data. For example, descrambler 250 may receive a block of encoded and scrambled data from lane deskew and alignment searcher 245. In response, descrambler 250 can descramble the block of encoded and scrambled data. In some embodiments, descrambler 250 employs a self-synchronizing descrambling technique to descramble the block of encoded and scrambled data. After descrambling the block of data, descrambler 250 sends it to decoder 255 for further processing.

Decoder 255 handles the decoding of blocks of encoded data into packets of data. For instance, decoder 255 can receive blocks of encoded data from descrambler 250, decode them, and then construct an Ethernet packet from the blocks of decoded data. In some embodiments, decoder 255 employs a 64b/66b decoding schemed to decode the blocks of data.

Operating system 260 is a software program executable on network device 235 that performs a variety of functions for facilitating the operation of network device 205. For example, operating system 260 may be responsible for configuring cross point switch 240. When operating system 260 receives alignment data from lane deskew and alignment searcher 245 indicating the logical lane associated with each of the transceivers 241-244, operating system 260 configures cross point switch 240 to connect the inputs and outputs of cross point switch 240 so that the order of the logical lanes outputted from cross point switch 240 is the same as a defined order of logical lanes. Operating system 260 can provide a command line interface (CLI) through which network device 235 (e.g., components of network device 235) can be configured and/or programmed. Additionally, operating system 260 may configure the mode of the ports 236-239. For instance, in some embodiments, ports 236-239 may be configured as four independent links (e.g., four 10 Gigabit links). In some such embodiments, each independent link may have its own descrambler and decoder. Operating system 260 can also receive status information from ports 236-239. Examples of such status information include whether an SFP transceiver is plugged in the ports 236-239 or not, the transmit power (tx) level, the receive (rx) light level, etc. Operating system 260 may also report the status of lane deskew and decoder error counts for the purpose of diagnostics. Operating system 260 can additionally report whether the individual links are up or down, the physical layer, and whether the link formed collectively by ports 236-239 is up or down.

FIG. 2 shows two network devices with different sets of components for purposes of simplicity and explanation.

However, one of ordinary skill in the art will appreciate that network device 205 can include the components of network device 235. Similarly, one of ordinary skill in the art will realize the network device 235 may include the components of network device 205. Stated differently, while network device 205 is described as being the transmit network device and network device 235 is described as being the receive network device, network device 205 and network device 235 can each function as both a transmit network device and a receive network device.

Figure 3:
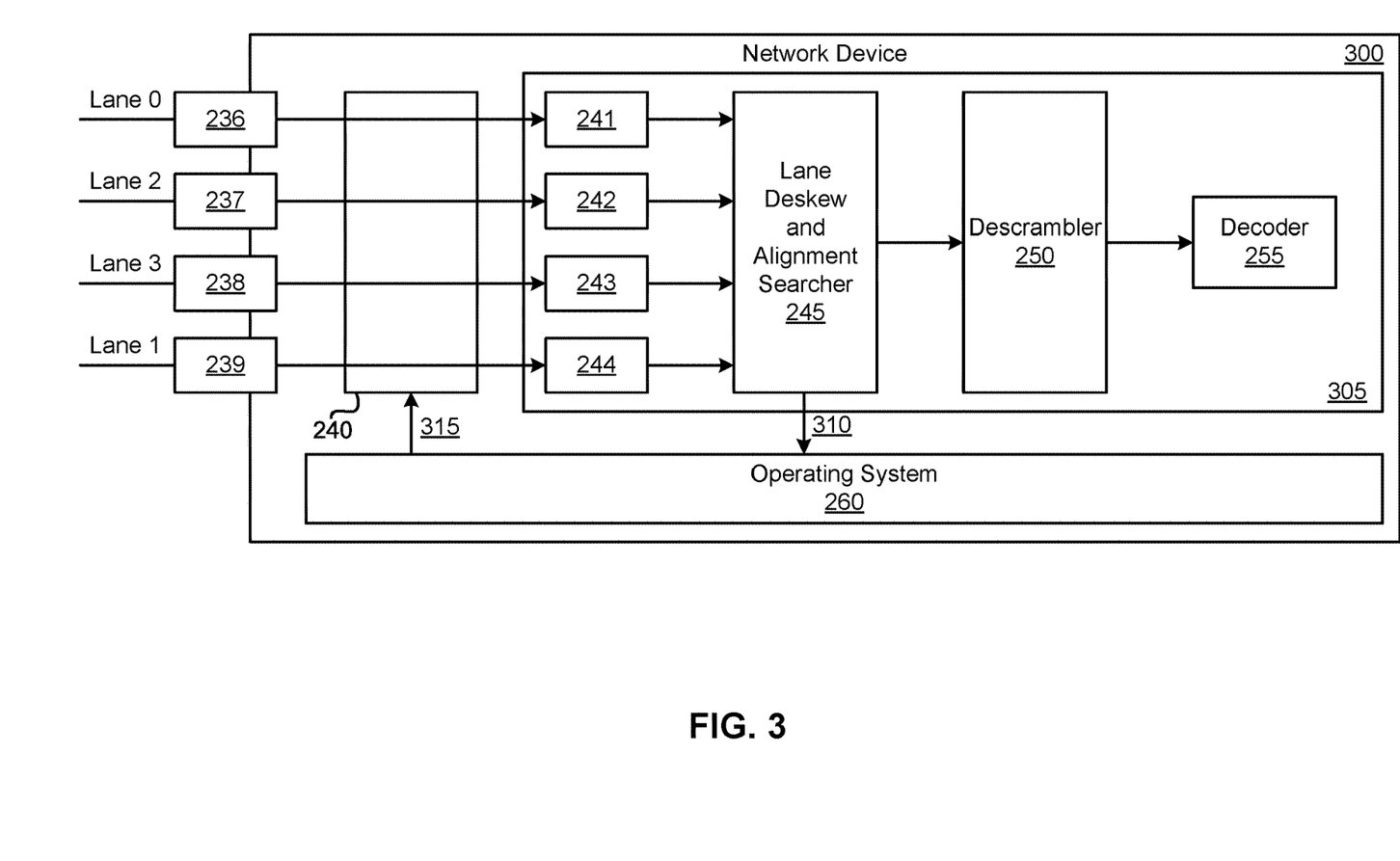
FIG. 3 illustrates an architecture of a network device according to some embodiments.

FIG. 3 illustrates an architecture of network device 300 according to some embodiments. In some embodiments, network device 300 can be used to implement network device 235. As shown, network device 300 includes the same components as network device 235. In this example, FIG. 3 illustrates that transceivers 241-244, lane deskew and alignment searcher 245, descrambler 250, and decoder 255 are implemented by a field programmable gate array (FPGA) 305.

An example operation will now be described by reference to FIG. 3. The example operation is a reordering of physical connections so that the logical lanes associated with the physical connections are ordered according to a defined order. As indicated in FIG. 3, for this example, logical lane 0 is associated with physical connection 236, logical lane 2 is associated with physical connection 237, logical lane 3 is associated with physical connection 238, and logical lane 1 is associated with physical connection 239. In addition, FIG. 3 shows that cross point switch 240 is configured so that the input coupled to physical connection 236 is connected to transceiver 241, the input coupled to physical connection 237 is connected to transceiver 242, the input coupled to physical connection 238 is connected to transceiver 243, and the input coupled to physical connection 239 is connected to transceiver 244.

The example operations starts by lane deskew and alignment searcher 245 detecting alignment data received from one of the transceiver 241-244. For example, lane deskew and alignment searcher 245 detects one of the predefined unique values associated with a logical lane from one of the transceivers 241-244. In response, lane deskew and alignment searcher 245 locks the lane of the transceiver. Lane deskew and alignment searcher 245 continues to lock the lane of remaining transceivers upon detecting alignment data from the transceiver. Once lane deskew and alignment searcher 245 detects alignment data from all of the transceivers 241-244, lane deskew and alignment searcher 245 determines the logical lane associated with each of the transceivers 241-244 based on the received alignment data. In this example, lane deskew and alignment searcher 245 determines that logical lane 0 is associated with transceiver 241, logical lane 2 is associated with transceiver 242, logical lane 3 is associated with transceiver 243, and logical lane 1 is associated with transceiver 244. Lane deskew and alignment searcher 245 sends, at operation 310, the determinations to operating system 260.

Upon receiving the associations between logical lanes and transceivers 241-244, operating system 260 generates configuration information for configuring cross point switch 240. For this example, operating system 260 stores information (e.g., a mapping between inputs and outputs of cross point switch 240) indicating that cross point switch 240 is currently configured so that the input coupled to physical connection 236 is connected to transceiver 241, the input coupled to physical connection 237 is connected to transceiver 242, the input coupled to physical connection 238 is connected to transceiver 243, and the input coupled to physical connection 239 is connected to transceiver 244. In this example, the defined order of logical lanes is such that data for logical lane 0 is received at transceiver 241, data for logical lane 1 is received at transceiver 242, data for logical lane 2 is received at transceiver 243, and data for logical lane 3 is received at transceiver 244. Therefore, operating system 260 generates configuration information that would connect the input coupled to physical connection 236 to transceiver 241, connect the input coupled to physical connection 237 to transceiver 242, connect the input coupled to physical connection 238 to transceiver 243, and connect the input coupled to physical connection 239 to transceiver 244. Once the configuration information is generated, operating system 260 uses, at 315, the configuration information to reconfigure cross point switch 240.

Figure 4A:
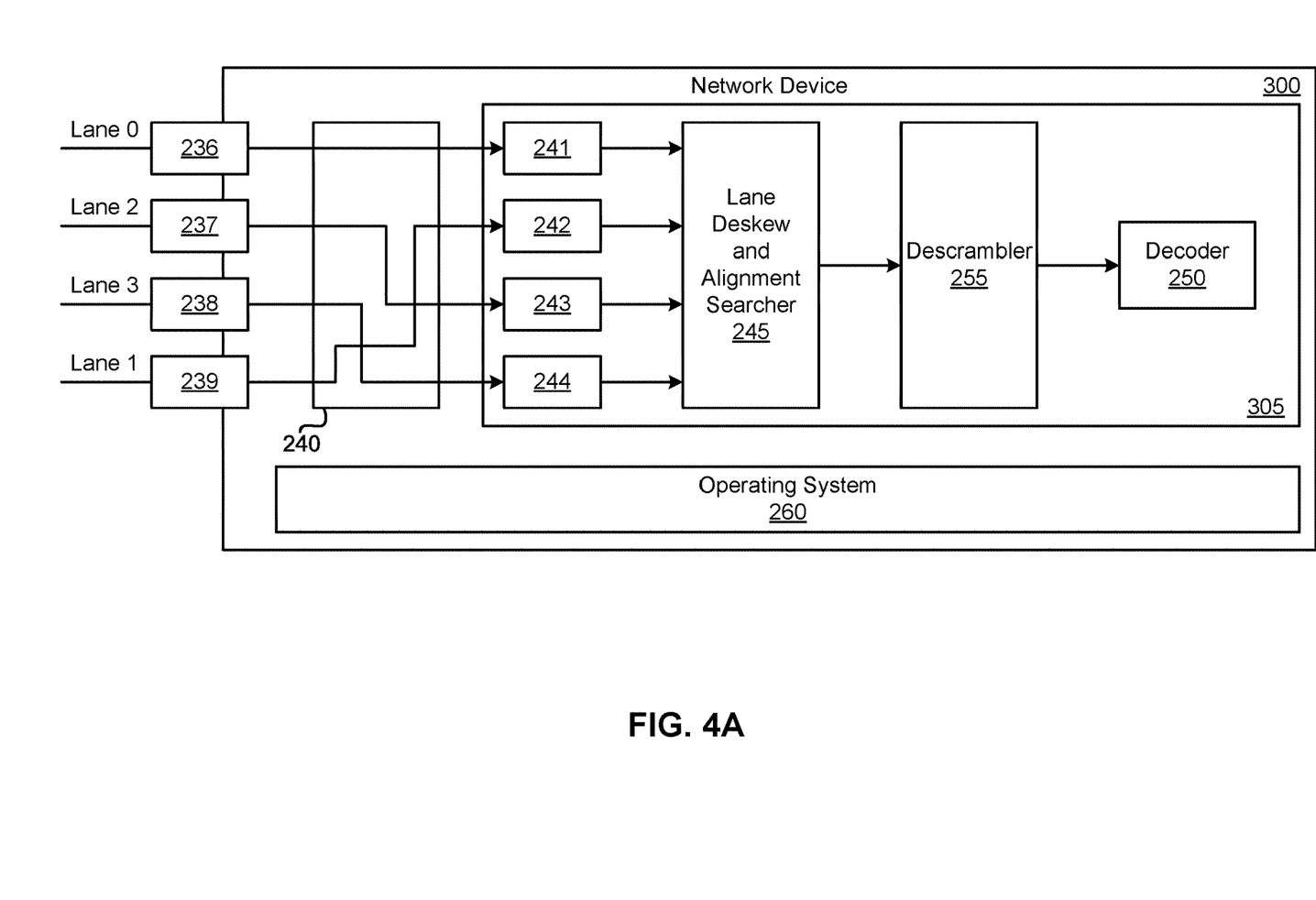
FIG. 4A illustrates the network device illustrated in FIG. 3 after lanes for a network interface are reordered according to some embodiments.

FIG. 4A illustrates the network device illustrated in FIG. 3 after lanes for a network interface are reordered according to some embodiments. As shown, after operating system 260 reconfigures cross point switch 240 with the generated configuration information in the example operation, cross point switch 240 is now configured so that the input coupled to physical connection 236 is connected to transceiver 241, the input coupled to physical connection 237 is connected to transceiver 243, the input coupled to physical connection 238 is connected to transceiver 244, and the input coupled to physical connection 239 is connected to transceiver 242. Based on this configuration of cross point switch 240, data for logical lane 0 will be received at transceiver 241, data for logical lane 1 will be received at transceiver 242, data for logical lane 2 will be received at transceiver 243, and data for logical lane 3 will be received at transceiver 244.

Figure 4B:
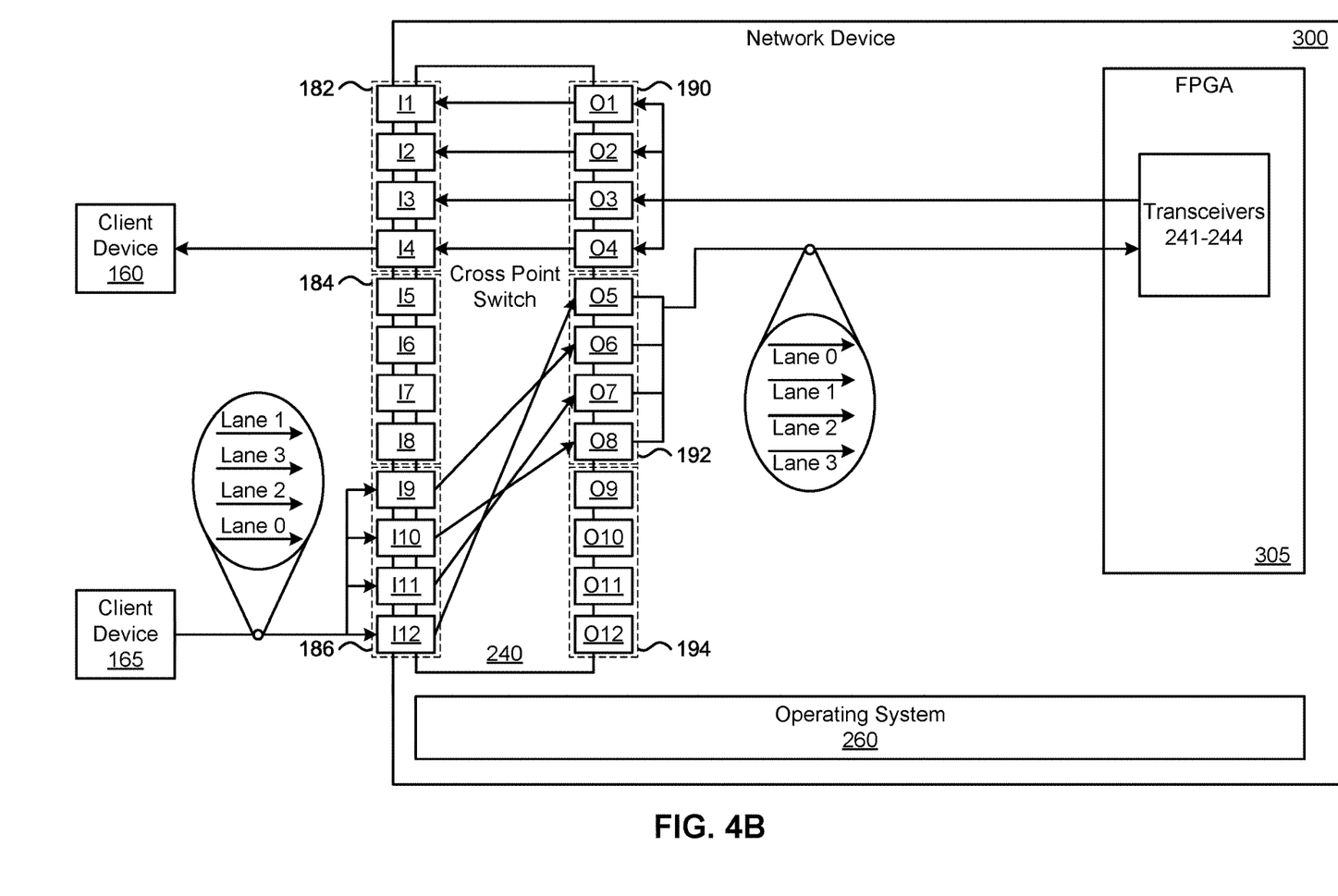
FIG. 4B illustrates the network device illustrated in FIG. 3 after lanes for another network interface are reordered according to some embodiments.

FIG. 4B illustrates the network device illustrated in FIG. 3 after lanes for another network interface are reordered according to some embodiments. FIG. 4B illustrates network device 300 in a similar example as that illustrated in FIG. 1B except, in this example, cross point switch 240 is used to reorder the lanes of the second network interface (i.e., physical connections coupled to inputs I9-I12). Here, operating system 260 has received alignment data from lane deskew and alignment searcher 245 (not shown) indicating that the order of the logical lanes is 1, 3, 2, 0. When operating system 260 receives the alignment data, operating system 260 generates configuration information for configuring cross point switch 240 to connect input port 186 to output port 192 so that input I9 is connected to output O6, input I10 is connected to output O8, input I11 is connected to output O7, and input I12 is connected to output O5. Operating system 260 uses the configuration information to configure cross point switch 240 accordingly. In this fashion, cross point switch 240 can be utilized to reorder the physical lanes of the second network interface instead of using FPGA 305 to reorder them.

FIGS. 3 and 4 show a single Ethernet port (comprised of four SFPs) communicatively coupled to an FPGA. In some embodiments, multiple of the same or similar Ethernet ports may be communicatively coupled to a single FPGA. In some such embodiments, network switch 235 can include multiple FPGA. Each of the FPGAs may include one or more of the same or similar Ethernet ports illustrated in FIGS. 3 and 4. In addition, while FIGS. 3 and 4 show transceivers 241-244, lane deskew and alignment searcher 245, descrambler 250, and decoder 255 being implemented by FPGA 305, one of ordinary skill in the art will understand that these components may be implemented differently in different embodiments. For instance, transceivers 241-244, lane deskew and alignment searcher 245, descrambler 250, and decoder 255 can be implemented as an application-specific integrated circuit (ASIC) in some embodiments.

The examples and embodiments described above by reference to FIGS. 3 and 4 show an operating system include in network devices. One of ordinary skill in the art will appreciate that the same or similar functions of each operating system described above may be implemented in a software component other than an operating system. For example, the respective functions of the operating system can be implemented in a program or application executing on the respective network device. Furthermore, one of ordinary skill in the art will realize that the functions of each operating system can be implemented by a software component executing on a device separate from the respective network device. For instance, such a software component can be implemented on a cloud computing system communicatively coupled to the respective network device in some embodiments.

Figure 5:
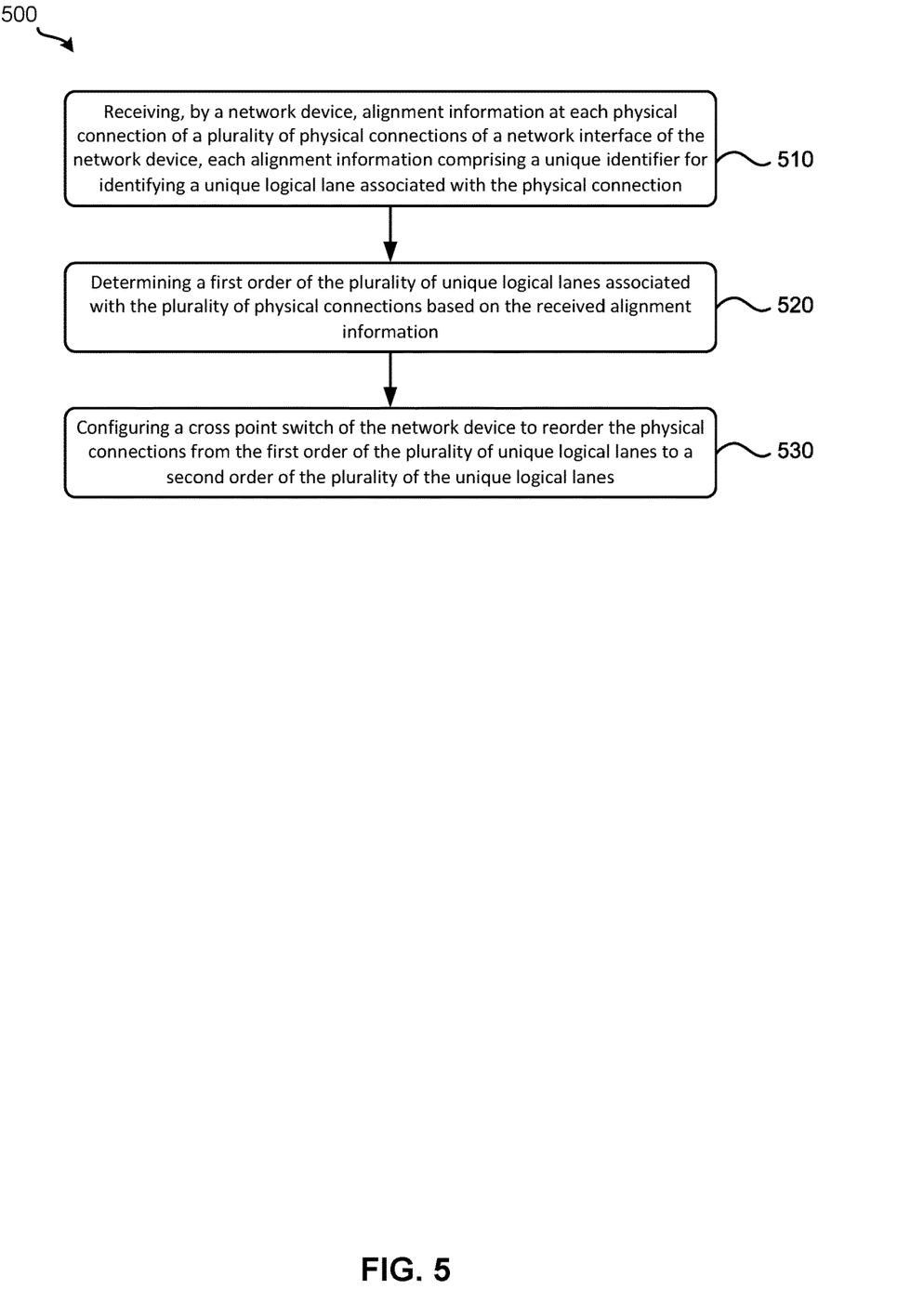
FIG. 5 illustrates a process for reordering lanes for a network interface of a network device according to some embodiments.

FIG. 5 illustrates a process 500 for reordering lanes for a network interface of a network device according to some embodiments. In some embodiments, network device 235 and network device 300 can each perform process 500. Process 500 begins by receiving, at 510, by a network device, alignment information at each physical connection of a plurality of physical connections of a network interface of the network device. Each alignment information comprises a predefined unique value for identifying a unique logical lane associated with the physical connection. Referring to FIG. 3 as an example, lane deskew and alignment searcher 245 may detect alignment data received from each of the transceivers 241-244, which received the alignment data from physical connections 236-239.

Next, process 500 determines, at 520, a first order of the plurality of unique logical lanes associated with the plurality of physical connections based on the received alignment information. Referring to FIG. 3 as an example, lane deskew and alignment searcher 245 may determine that that logical lane 0 is associated with transceiver 241, logical lane 2 is associated with transceiver 242, logical lane 3 is associated with transceiver 243, and logical lane 1 is associated with transceiver 244. Lane deskew and alignment searcher 245 can send these determinations to operating system 260.

Finally, process 500 configures, at 530, a cross point switch of the network device to reorder the physical connections from the first order of the plurality of unique logical lanes to a second order of the plurality of the unique logical lanes. Referring to FIG. 3 as an example, operating system 260 generates configuration information to configure cross point switch 240 so that the logical lanes are ordered according to the defined order of logical lanes, which in this example is such that data for logical lane 0 is received at transceiver 241, data for logical lane 1 is received at transceiver 242, data for logical lane 2 is received at transceiver 243, and data for logical lane 3 is received at transceiver 244. Thus, operating system 260 generates configuration information that would connect the input coupled to physical connection 236 to transceiver 241, connect the input coupled to physical connection 237 to transceiver 242, connect the input coupled to physical connection 238 to transceiver 243, and connect the input coupled to physical connection 239 to transceiver 244. After generating the configuration, operating system 260 configures cross point switch 240 using the generated configuration information.

The following are some example embodiments of the present disclosure. In some embodiments, a method receives, by a network device, alignment information at each physical connection of a plurality of physical connections of a network interface of the network device. Each alignment information comprises a unique value for identifying a unique logical lane associated with the physical connection. The method further determines a first order of the plurality of unique logical lanes associated with the plurality of physical connections based on the received alignment information. The method also configures a cross point switch of the network device to reorder the physical connections from the first order of the plurality of unique logical lanes to a second order of the plurality of the unique logical lanes.

In some embodiments, the method may further send the determination of the first order of the plurality of unique logical lanes to an operating system executing on the network device. Configuring the cross point switch of the network device may be performed by the operating system. The network device may be a first network device. The alignment information may be received from a second network device. The method may further receive a plurality of blocks of encoded data from the second network device, descramble the plurality of blocks of encoded data, and decode the plurality of blocks of encoded data into a packet of data. The second network device may have generated the plurality of blocks of encoded data from a sequential stream of data. Descrambling the plurality of blocks of encoded data may include iteratively retrieving each block of encoded data from the plurality of blocks of encoded data in a round robin manner and constructing a sequential stream of blocks of encoded data based on the retrieved blocks of encoded data from the plurality of blocks of encoded data. The method may further convert each block of encoded data in the plurality of blocks of encoded data from a serial string of bits into a parallel string of bits.

In some embodiments, a network device includes a cross point switch. The network device further includes a network interface comprising a plurality of physical connections. Each physical connection of the plurality of physical connections is configured to receive alignment information. Each alignment information comprises a unique value for identifying a unique logical lane associated with the physical connection. The network device also includes an alignment searcher configured to determine a first order of the plurality of unique logical lanes associated with the plurality of physical connections based on the received alignment information. The network device further includes an operating system configured to configure the cross point switch of the network device to reorder the physical connections from the first order of the plurality of unique logical lanes to a second order of the plurality of the unique logical lanes.

In some embodiments, the alignment searcher may be further configured to send the determination of the first order of the plurality of unique logical lanes to the operating system. The network device may be a first network device. The alignment information may be received from a second network device. The plurality of physical connections of the network interface may be configured to receive a plurality of blocks of encoded data from the second network device. The network device may further include a descrambler configured to descramble the plurality of blocks of encoded data and a decoder configured to decode the plurality of blocks of encoded data into a packet of data. The second network device may have generated the plurality of blocks of encoded data from a sequential stream of data. The descrambler may be further configured to descramble the plurality of blocks of encoded data by iteratively retrieving each block of encoded data from the plurality of blocks of encoded data in a round robin manner and constructing a sequential stream of blocks of encoded data based on the retrieved blocks of encoded data from the plurality of blocks of encoded data. The network device may further include a plurality of transceivers configured to converting each block of encoded data in the plurality of blocks of encoded data from a serial string of bits into a parallel string of bits.

In some embodiments, a non-transitory machine-readable medium stores a program executable by at least one processing unit of a network device. The program receives alignment information at each physical connection of a plurality of physical connections of a network interface of the network device. Each alignment information comprises a unique value for identifying a unique logical lane associated with the physical connection. The program further determines a first order of the plurality of unique logical lanes associated with the plurality of physical connections based on the received alignment information. The program also configures a cross point switch of the network device to reorder the physical connections from the first order of the plurality of unique logical lanes to a second order of the plurality of the unique logical lanes.

In some embodiments, the program may further send the determination of the first order of the plurality of unique logical lanes to an operating system executing on the network device. Configuring the cross point switch of the network device may be performed by the operating system. The network device may be a first network device. The alignment information may be received from a second network device. The program may further receive a plurality of blocks of encoded data from the second network device, descramble the plurality of blocks of encoded data, and decode the plurality of blocks of encoded data into a packet of data. The second network device may have generated the plurality of blocks of encoded data from a sequential stream of data. Descrambling the plurality of blocks of encoded data may include iteratively retrieving each block of encoded data from the plurality of blocks of encoded data in a round robin manner and constructing a sequential stream of blocks of encoded data based on the retrieved blocks of encoded data from the plurality of blocks of encoded data.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
    receiving, by a first network device, alignment information from a second network device at each physical connection of a plurality of physical connections of a network interface of the first network device, each alignment information comprising a unique value for identifying a unique logical lane associated with the physical connection;
    determining a first order of the plurality of unique logical lanes associated with the plurality of physical connections based on the received alignment information;
    configuring a cross point switch of the first network device to reorder the physical connections from the first order of the plurality of unique logical lanes to a second order of the plurality of the unique logical lanes;
    receiving, by the first network device, a plurality of blocks of encoded data from the second network device;
    descrambling the plurality of blocks of encoded data; and
    decoding the plurality of blocks of encoded data into a packet of data.

2. The method of claim 1 further comprising sending the determination of the first order of the plurality of unique logical lanes to an operating system executing on the network device, wherein configuring the cross point switch of the network device is performed by the operating system.

3. The method of claim 1 further comprising deskewing the plurality of blocks based on the alignment information received from the second network device at each physical connection of the plurality of physical connections of the network interface of the first network device.

4. The method of claim 1, wherein descrambling the plurality of blocks of encoded data comprises:
    iteratively retrieving each block of encoded data from the plurality of blocks of encoded data in a round robin manner; and
    constructing a sequential stream of blocks of encoded data based on the retrieved blocks of encoded data from the plurality of blocks of encoded data.

5. The method of claim 1, wherein the second network device generated the plurality of blocks of encoded data from a sequential stream of data.

6. The method of claim 1, wherein descrambling the plurality of blocks of encoded data comprises iteratively retrieving each block of encoded data from the plurality of blocks of encoded data in a round robin manner and constructing a sequential stream of blocks of encoded data based on the retrieved blocks of encoded data from the plurality of blocks of encoded data.

7. The method of claim 1 further comprising converting each block of encoded data in the plurality of blocks of encoded data from a serial string of bits into a parallel string of bits.

8. A first network device comprising:
    a cross point switch;
    a network interface comprising a plurality of physical connections, each physical connection of the plurality of physical connections configured to alignment information receive from a second network device, each alignment information comprising a unique value for identifying a unique logical lane associated with the physical connection
    an alignment searcher configured to determine a first order of the plurality of unique logical lanes associated with the plurality of physical connections based on the received alignment information;
    an operating system configured to configure the cross point switch of the network device to reorder the physical connections from the first order of the plurality of unique logical lanes to a second order of the plurality of the unique logical lanes;
    wherein the plurality of physical connections of the network interface is further configured to receive a plurality of blocks of encoded data from the second network device;
    a descrambler configured to descramble the plurality of blocks of encoded data; and
    a decoder configured to decode the plurality of blocks of encoded data into a packet of data.

9. The first network device of claim 8, wherein the alignment searcher is further configured to send the determination of the first order of the plurality of unique logical lanes to the operating system.

10. The first network device of claim 8 further comprising a lane deskewer configured to deskew the plurality of blocks based on the alignment information received from the second network device at each physical connection of the plurality of physical connections of the network interface of the first network device.

11. The first network device of claim 8, wherein the descrambler descrambles the plurality of blocks of encoded data by:
iteratively retrieving each block of encoded data from the plurality of blocks of encoded data in a round robin manner; and
constructing a sequential stream of blocks of encoded data based on the retrieved blocks of encoded data from the plurality of blocks of encoded data.

12. The first network device of claim 8, wherein the second network device generated the plurality of blocks of encoded data from a sequential stream of data.

13. The first network device of claim 8, wherein the descrambler is further configured to descramble the plurality of blocks of encoded data by iteratively retrieving each block of encoded data from the plurality of blocks of encoded data in a round robin manner and constructing a sequential stream of blocks of encoded data based on the retrieved blocks of encoded data from the plurality of blocks of encoded data.

14. The first network device of claim 8 further comprising a plurality of transceivers configured to converting each block of encoded data in the plurality of blocks of encoded data from a serial string of bits into a parallel string of bits.

15. A non-transitory machine-readable medium storing a program executable by at least one processing unit of a first network device, the program comprising sets of instructions for:
receiving alignment information from a second network device at each physical connection of a plurality of physical connections of a network interface of the first network device, each alignment information comprising a unique value for identifying a unique logical lane associated with the physical connection;
determining a first order of the plurality of unique logical lanes associated with the plurality of physical connections based on the received alignment information
configuring a cross point switch of the first network device to reorder the physical connections from the first order of the plurality of unique logical lanes to a second order of the plurality of the unique logical lanes;
receiving, by the first network device, a plurality of blocks of encoded data from the second network device;
descrambling the plurality of blocks of encoded data; and
decoding the plurality of blocks of encoded data into a packet of data.

16. The non-transitory machine-readable medium of claim 15, wherein the program further comprises a set of instructions for sending the determination of the first order of the plurality of unique logical lanes to an operating system executing on the network device, wherein configuring the cross point switch of the network device is performed by the operating system.

17. The non-transitory machine-readable medium of 15, wherein the program further comprises a set of instructions for converting each block of encoded data in the plurality of blocks of encoded data from a serial string of bits into a parallel string of bits.

18. The non-transitory machine-readable medium of 15, wherein the program further comprise a set of instructions for deskewing the plurality of blocks based on the alignment information received from the second network device at each physical connection of the plurality of physical connections of the network interface of the first network device.

19. The non-transitory machine-readable medium of claim 15, wherein the second network device generated the plurality of blocks of encoded data from a sequential stream of data.

20. The non-transitory machine-readable medium of claim 15, wherein descrambling the plurality of blocks of encoded data comprises iteratively retrieving each block of encoded data from the plurality of blocks of encoded data in a round robin manner and constructing a sequential stream of blocks of encoded data based on the retrieved blocks of encoded data from the plurality of blocks of encoded data.

* * * * *